April 3, 1951        W. L. HALL        2,547,864
COASTER BRAKE
Filed June 11, 1948        2 Sheets-Sheet 1
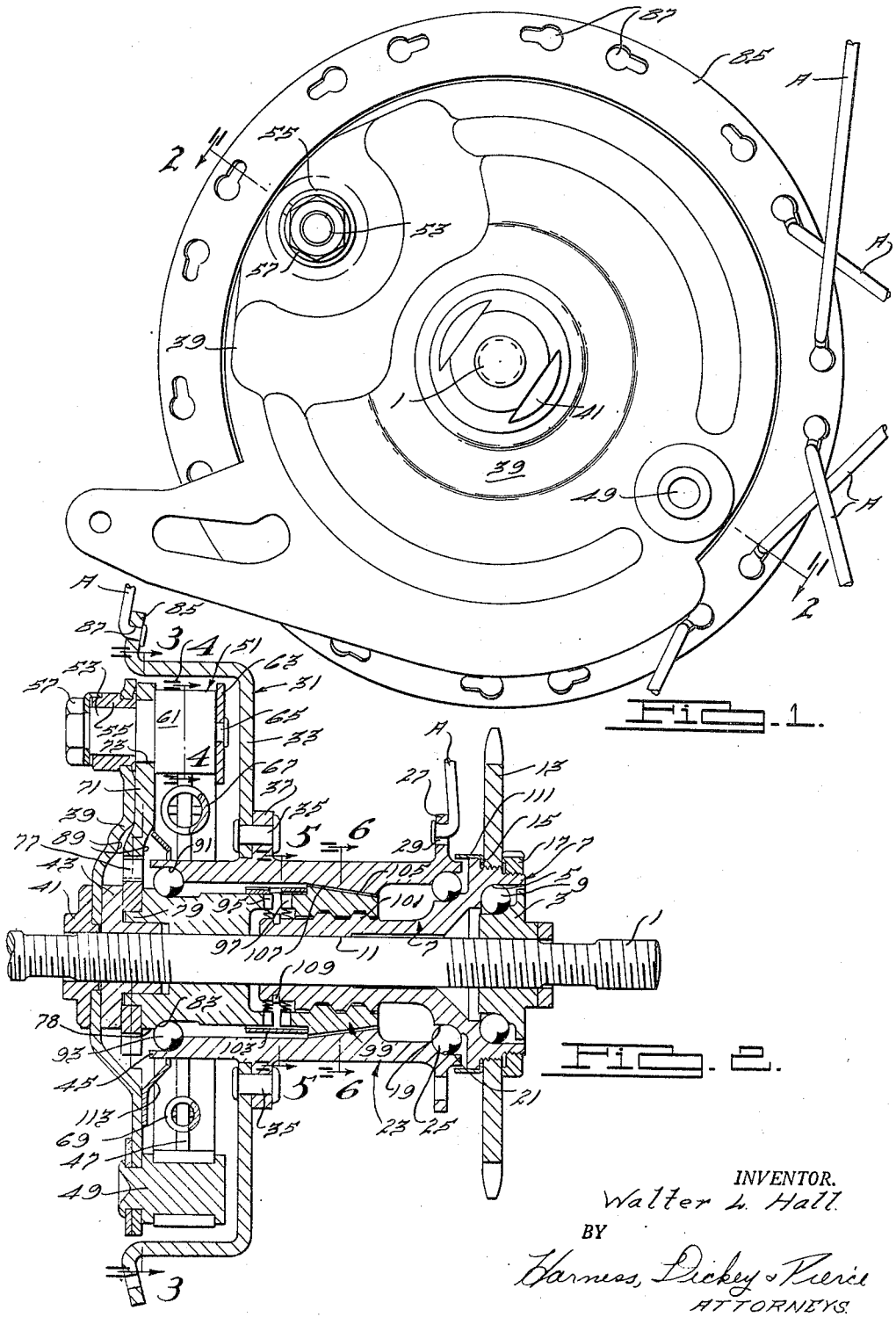
INVENTOR.
Walter L. Hall
BY
Harness, Dickey & Pierce
ATTORNEYS.

April 3, 1951        W. L. HALL        2,547,864
COASTER BRAKE
Filed June 11, 1948        2 Sheets-Sheet 2
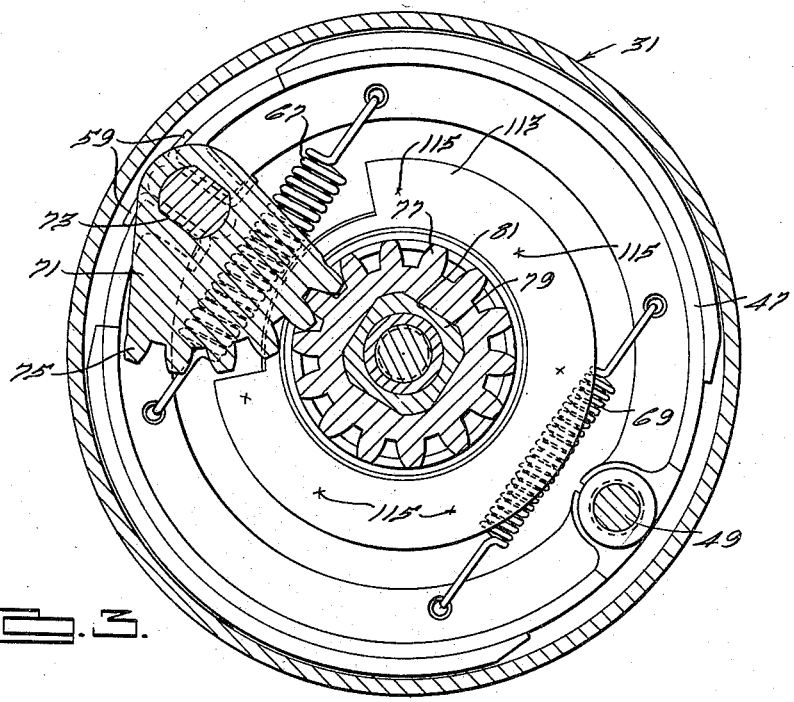
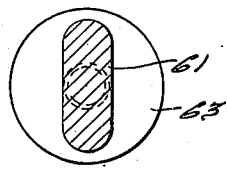
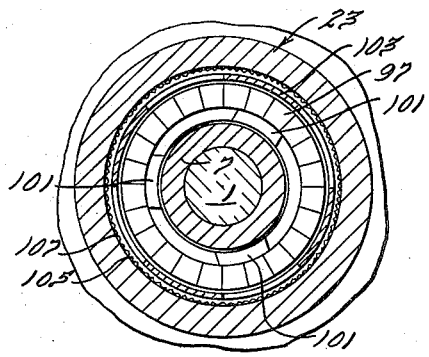
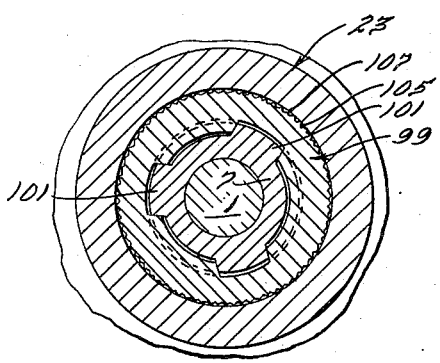
INVENTOR.
Walter L. Hall
BY
Harness, Dickey & Pierce
ATTORNEYS.

Patented Apr. 3, 1951

2,547,864

UNITED STATES PATENT OFFICE 2,547,864

COASTER BRAKE

Walter L. Hall, Pontiac, Mich., assignor to Whizzer Motor Company, Pontiac, Mich., a corporation of Delaware Application June 11, 1948, Serial No. 32,495

1 Claim. (Cl. 192—6)

This invention relates to bicycles, motorbikes, and the like and in particular refers to coaster brakes therefor.

In recent years developments in bicycles and the application of motors thereto have resulted in greatly increased weights and speeds of operation and consequently in a need for improved brakes. Brakes of the enlarged drum type which would satisfy this need have been proposed, but prior suggestions have other objections or disadvantages when compared with the coaster brakes of the more conventional types. One of the major objections has been that the drum type brakes heretofore provided have extended substantially outside of the spokes of the wheel where they often interfered with the legs of the rider or undesirably increased the width of the bicycle. Another objection has been that the bearings wear rapidly.

Because of these and other disadvantages of the structures now available to the art, it is an object of this invention to provide a compact coaster brake of the enlarged drum type which may be fitted between the spokes of a wheel. Another object is to decrease the rate of wear of the bearings in coaster brakes of this type. A further object is to provide an improved connection between the drive sprocket and the brake shoes for the purpose of facilitating the braking operation and to reduce or eliminate shock loads upon resumption of forward motion when the brake is released.

These and other objects of the invention are accomplished by a construction in which the hub is rotatably supported by bearings at each end, and an enlarged outwardly opening brake drum is affixed thereto intermediate the ends. The drum has an outer radial flange which is adapted to receive spokes at one side of the wheel and is substantially in a plane with a rotary hub bearing, thereby reducing or eliminating overhang on the bearing and thus reducing its load and prolonging its life. The other end of the hub is provided with means to receive wheel spokes so that the hub and brake drum are compactly housed between the spokes on opposite sides of the wheels. In order to actuate the expanding cam for the brake shoes which cooperate with the brake drum, a brake actuator is rotatably mounted on the wheel axle and has ratchet teeth which are drivingly engaged by a clutch member upon back pedaling. The brake actuator carries gear teeth which engage a sector that is keyed to the expanding cam so that by selecting the relative diameters of the gear and sector the lever arm and thus the expanding force on the brake shoes can be varied. The actuator and clutch are yieldably connected together for rotation by a retarding ring and the expanding cam is designed so that upon release of braking forces automatic brake contracting means pivots it to rotate the actuator and thus the clutch into a position of incipient engagement with the hub.

Other objects and features of the invention will become apparent upon consideration of the accompanying drawings, in which:

Figure 1 is a side elevation from the drum end of the improved coaster brake;

Figure 2 is a longitudinal section taken on the line 2—2 of Figure 1;

Figure 3 is a sectional view, similar to Figure 1 with the anchor plate removed, taken along the line 3—3 of Figure 2;

Figure 4 is an enlarged section through the expanding cam taken on the line 4—4 of Figure 2;

Figure 5 is an enlarged cross section on the line 5—5 of Figure 2;

Figure 6 is an enlarged cross section on the line 6—6 of Figure 2; and

Figure 7 is an enlarged detail view in perspective of a retarding ring which may be employed in the practice of the invention.

As illustrated in the drawings, the bicycle wheel (not shown) has the usual fixed axle 1. The right or sprocket end of the axle 1 may have a bearing cone or race 3 which cooperates with an internal bearing race 5 in the drive worm 7 to form a track for the ball bearings 9. The drive worm 7 is also rotatably mounted on the axle 1 by means of its internal bore 11 and is driven by the sprocket 13 which is threadably affixed thereto in a plane with the bearings 9 and held in fixed axial position by means of a shoulder 15 and a locknut 17.

The worm 7 has an outer bearing race 19 which cooperates with an inner race 21 at the sprocket end of the hollow hub 23, which surrounds the worm and axle, to form a track for the ball bearing 25. The hub 23 has a radial flange 27, approximately in the plane of the bearings, with apertures 29 thereon whereby the spokes A of the wheel may be connected thereto.

An outwardly opening brake drum 31 has its inner side wall 33 rigidly attached by suitable means such as rivets 35 to a radial flange 37 on the hub 23 which is intermediate the ends thereof. A radial anchor plate 39 is mounted in fixed axial position on the axle 1 as by the nuts 41 and 43 to form in effect an outer side wall for the drum 31 which is spaced slightly beyond the outer end 45 of the hub 23. A pair of expandible semi-circular brake shoes 47 are pivotally connected together and to the anchor plate 39 in the usual manner by means of the pin or anchor bolt 49. An expanding cam member 51 has a stem 53 which is pivotally mounted in a bushing 55 in the anchor plate and axially connected thereto by means of a nut 57 threaded on the stem 53. The free ends of the brake shoes 47 may have wear plates 59 thereover, which are engaged by the elongated cam portion 61 (Fig. 4), having flat sides and rounded ends, of the cam member 51. A washer 63 may be affixed, as by the screw or rivet 65, to the inner end of the cam member 51 to bear upon the sides of the brake shoes 47 and thus prevent outward axial movement of the member.

The brake shoes 47 are yieldably held in contracted position by means of the tension springs 67 and 69 on either side of their axis which connect them together. The expanding cam 51 is pivotally moved in its bearing 55 by means of a gear sector 71 which has a noncircular bore by means of which it is keyed to a noncircular portion of the cam stem 53 as shown at 73 (Fig. 4). The sector 71 has peripheral gear teeth 75 which engage the peripheral teeth of the gear 77 which is likewise keyed by means of a noncircular bore to a brake actuator 79 as shown at 81 (Fig. 3). The nut 43 holds the gear 77 against the outer radial shoulder of a radial flange 78 formed on the actuator 79. The brake actuator 79 is rotatably mounted on the axle 1 whereby it is capable of rotating the gears 71 and 77 and thus of expanding the brake shoes 47 through the medium of the cam 51. The flange 78 has the inner radial face or shoulder which is shaped to provide a bearing race or cone 83 and lies in approximately the plane of an outer radial flange 85 which has spoke holes 87 on the drum 31. It will be noted that the anchor plate 39 and the sector 77 may be curved or dished outwardly as shown at 89 so that the plane of the race 83 and the plane of the flange 85 are as nearly coincident as practicable. The drum end 45 of the hub 23 has an inner ball race or core 91 which cooperates with the race 83 to provide a track for the ball bearings 93 whereby the hub is rotatably mounted on the actuator 79 and thus rotatably connected to the axle 1.

The inner end of the actuator 79 has ratchet teeth 95 which are engaged by similar teeth 97 in the end of a clutch member 99. The clutch 99 is internally threaded on the worm teeth 101 of the drive worm 7 so that it moves axially toward the actuator 79 when the sprocket 13 is back-pedaled and in the reverse axial direction when the sprocket 13 is rotated forwardly. Idle rotation of the clutch 99 rather than axial movement when the worm 7 is rotated is yieldably prevented by a retarding ring 103 (Fig. 7) of known design comprising an annular resilient spring continuously engaging the outer peripheries of both the actuator and clutch. The clutch has a knurled, conical, outer surface 105 which engages a tapered bore 107 in the hub 23 in a friction drive when the sprocket 13 and worm 7 are rotated forwardly to move the clutch 99 axially to the right.

The worm 7 may have an annular stop ring 109 to limit axial travel of the clutch 99 toward the actuator 79 and thus relieve the bearings of load due to axial pressure between clutches 95 and 97. If desired a shield 111 may be attached to the worm 7 over the shoulder 15 and the end of hub 23 to prevent entrance of foreign material into the bearing 25. Also, if desired, an annular deflector plate 113 may surround the end 45 of the hub 23 and be affixed as by the welds 115 to the anchor plate 39 to prevent entrance of foreign material from the brake drum into the bearings 93 or passage of grease from the bearing to the drum.

In operation, as the sprocket 13 and attached worm 7 are rotated forwardly, the clutch 99 is driven axially into engagement with the hub bore 107. This engagement prevents further axial movement of the clutch so that it is rotated by the worm 7 and the frictional engagement between its outer surface 105 and the bore 107 is sufficient to transmit the rotary motion of the worm and sprocket to the hub 23 which therefore rotates on the end bearings 25 and 93. Rotation of the hub and affixed drum 31 is transmitted through the spoke flanges 27 and 85 to the spokes A and thus to the periphery of the bicycle wheel (not shown) to cause forward movement of the bicycle.

When it is desired to cease forward motion of the bicycle, the sprocket 13 and worm 7 are back-pedaled or rotated in reverse. This drives the clutch 99 leftward so that its teeth 97 engage the teeth 95 of the brake actuator 79. This motion of the clutch 99 is limited by the stop ring 109 so that axial forces are not transmitted to the actuator. Continued reverse movement of the worm 7 causes the clutch 99 to rotate the actuator 79. Rotation of the actuator 79 rotates the gear 77 and the interconnected sector 71 and this pivots the cam 51 so that the cam portion 61 spreads the wear plates 59 apart against the resistance of springs 67 and 69 and forces the stationary brake shoes into frictional engagement with the inner periphery of the rotating drum 31 to brake the wheel in the conventional manner. When braking forces are released from the worm 7, the springs 67 and 69 contract the brake shoes. Because of the shape of the cam portion 61, the spring forces transmitted thereto from the wear plates 59 cause it to rotate back to its inactive position where the flat sides thereof are in engagement with the wear plates. This rotation of the cam member 51 is transmitted through the gears 71 and 77 to the brake actuator 79 which rotates in the forward direction with regard to the worm 7. This rotation is transmitted to the clutch 99 by the resilient retarding ring 103 and since the worm 7 is stationary the clutch is moved axially thereon to the right into incipient engagement with the hub bore 107. Thus, when the worm 7 is rotated forwardly by the sprocket 13, the clutch 99 does not have the opportunity to build up sufficient momentum before it engages the bore 107 to cause a shock load upon the parts. This feature therefore reduces the thrust and wear on the bearings.

In addition to this advantageous feature of construction, it will be noted that by placing the spoke flanges on the outer edges of the drum 31 and hub 23 and arranging the actuating mechanism therein that a desirably compact brake and hub assembly has been provided which is substantially entirely between the wheel spokes. Furthermore, by arranging the bearings 25 and 93 approximately in the planes of the spoke flanges the reaction loads received by the hub from the spokes are transmitted to the bearings without the addition of further components due to overhang, thus reducing the thrust on the bearings and prolonging the life thereof.

Other advantages of the invention as well as certain modifications thereof will be apparent to those skilled in the art, hence it is not intended to limit it to the specific details hereinbefore mentioned.

What is claimed is:

In a coaster brake and hub assembly for bicycle wheels or the like having an axle, the combination of a hub, a brake drum shell having an annular braking surface coaxial with said axle, said shell having spoke anchors on its outer edge and an inwardly extending radial web on its inner edge, said web being affixed to the hub intermediate the ends of the hub, a brake actuator rotatably mounted on the axle at the drum end thereof and having an outwardly facing radial shoulder adjacent its outer end, a gear drivably mounted on the outer end of the actuator and in engagement with the outer face of said radial shoulder, a nut threaded on the axle and abutting the outer face of the gear to hold it against said radial shoulder, said actuator having an inwardly facing radial shoulder spaced inwardly from the outer shoulder and located approximately in the plane of the spoke anchors and being shaped to provide a ball bearing race, the drum end of said hub being internally formed to provide a ball bearing race cooperating with said actuator race, ball bearings between said races whereby spoke load is transmitted from the drum to the axle without substantial overhang, a radial anchor plate mounted on the axle and abutting the outer end of said nut, another nut threaded on the axle to clamp the plate between said nuts, expanding brake shoes pivoted inside said drum on said plate, an expanding cam for said shoes pivoted on said anchor plate and extending inwardly toward said radial web, and a gear sector having teeth engaging and driven by said gear, said sector engaging and movable upon the inner face of said anchor plate and having a driving engagement with the expanding cam at a plane adjacent the inner face of the anchor plate, and means whereby the brake actuator is operated upon back-pedalling.

WALTER L. HALL.

REFERENCES CITED

The following references are of record in the file of this patent:

UNITED STATES PATENTS

| Number | Name | Date |
|---|---|---|
| 2,143,798 | Ribe | Jan. 10, 1939 |
| 2,291,486 | Musselman | July 28, 1941 |
| 2,321,150 | Lewis | June 8, 1943 |

FOREIGN PATENTS

| Number | Country | Date |
|---|---|---|
| 766,511 | France | Apr. 16, 1934 |